United States Patent [19]

Ono et al.

[11] Patent Number: 5,059,355
[45] Date of Patent: Oct. 22, 1991

[54] PROCESS FOR PREPARATION OF CRYSTALLINE OXYTITANIUM PHTHALOCYANINE

[75] Inventors: Hitoshi Ono, Yokohama; Yoshiaki Kato, Mitaka; Sumiko Watabe, Yokohama, all of Japan

[73] Assignee: Mitsubishi Kasei Corporation, Japan

[21] Appl. No.: 482,560

[22] Filed: Feb. 21, 1990

[30] Foreign Application Priority Data

Feb. 23, 1989 [JP] Japan ................... 1-44907

[51] Int. Cl.$^5$ ................ C09B 67/50; C09B 47/08; G03G 5/06
[52] U.S. Cl. .................... 252/584; 430/58; 430/59; 430/78; 106/410; 106/412; 540/141; 540/143
[58] Field of Search ............... 106/410, 412; 430/58, 430/59, 78; 540/141, 143; 252/584

[56] References Cited

U.S. PATENT DOCUMENTS

| 2,540,775 | 2/1951 | Brouillard et al. | 540/141 |
| 2,556,726 | 6/1951 | Lane | 540/141 |
| 2,999,862 | 9/1961 | Geiger | 540/141 |
| 3,351,481 | 11/1967 | Hopmeier et al. | 540/141 |
| 3,758,321 | 9/1973 | Santimauro et al. | 540/141 |
| 4,141,904 | 2/1979 | Cabut et al. | 106/412 |
| 4,239,685 | 12/1980 | Picasse | 106/410 X |
| 4,557,868 | 12/1985 | Page et al. | 540/143 |
| 4,777,251 | 10/1988 | Tanaka et al. | 540/141 |
| 4,882,427 | 11/1989 | Enokida et al. | 540/141 |
| 4,898,799 | 2/1990 | Fujimaki et al. | 540/141 |
| 4,921,773 | 5/1990 | Melnyk et al. | 430/58 |
| 5,008,173 | 4/1991 | Mimura et al. | 430/78 |

FOREIGN PATENT DOCUMENTS

| 63-357670 | 3/1988 | Japan . | |
| 1299874 | 12/1989 | Japan | 540/141 |

OTHER PUBLICATIONS

Chemical Abstracts, vol. 109, No, 2, 1988, p. 78, Abstract No. 8037g.
Chemical Abstracts, vol. 109, No. 6, 1988, p. 83, Abstract No. 39402b.

Primary Examiner—Robert L. Stoll
Assistant Examiner—Chhaya Sayala
Attorney, Agent, or Firm—David G. Conlin; David S. Resnick; Ronald I. Eisenstein

[57] ABSTRACT

A process for the preparation of crystalline oxytitanium phthalocyanine showing a distinct diffraction in peak at a Bragg angle ($2\theta \pm 0.2°$) of 27.3° in the X-ray diffraction spectrum, which comprises mechanically pulverizing oxytitanium phthalocyanine, dispersing it in water to form a suspension, adding an organic solvent into the suspension and heating the suspension.

7 Claims, 3 Drawing Sheets

PROCESS FOR PREPARATION OF CRYSTALLINE OXYTITANIUM PHTHALOCYANINE

BACKGROUND OF THE INVENTION

1. Field of the Invention

This invention relates to a process for the preparation of crystalline oxytitanium phthalocyanine. Particularly, it relates to a novel process for the preparation of crystalline oxytitanium phthalocyanine suitable for use in an electrophotographic photoreceptor.

2. Description of the Prior Art

In this field, it is well known that the oxytitanium phthalocyanine may be produced either in a semi-stable α-crystal phase or in a stable β-crystal phase depending on the production conditions. Further, it is also known that those two crystal phases may be converted from one to another under the influences of physical distortion, organic solvent and/or heat. For example, α-phase oxytitanium phthalocyanine can be converted into β-phase by heating in an organic solvent such as N-methylpyrrolidone.

On the other hand, Japanese Patent Application Laying Open (KOKAI) No. 63-20365 discloses that crystalline oxytitanium phthalocyanine of which crystal phase can not be classified neither as the α-phase nor as the β-phase and which shows an intense peak in the X-ray diffraction spectrum at a Bragg angle ($2\theta$) of 27.3° can be produced by forming an aqueous suspension of α-phase oxytitanium phthalocyanine obtained by the acid paste method, adding an aromatic hydrocarbon solvent into the suspension and heating the suspension, and that the obtained phthalocyanine is an useful material particularly as a recording material of an optical disc.

The object of the present invention is to provide a novel and industrially applicable process for the production of oxytitanium phthalocyanine having a crystal phase useful for various purposes such as for use in an electrophotographic photoreceptor.

SUMMARY OF THE INVENTION

The present invention is a process for the preparation of crystalline oxytitanium phthalocyanine showing a distinct diffraction peak at a Bragg angle ($2\theta \pm 0.2°$) of 27.3° in the X-ray diffraction spectrum which comprises mechanically pulverizing oxytitanium phthalocyanine, dispersing it in water to form a suspension, adding an organic solvent into the suspension and heating the suspension.

DETAILED DESCRIPTION OF THE INVENTION

Figure 3:
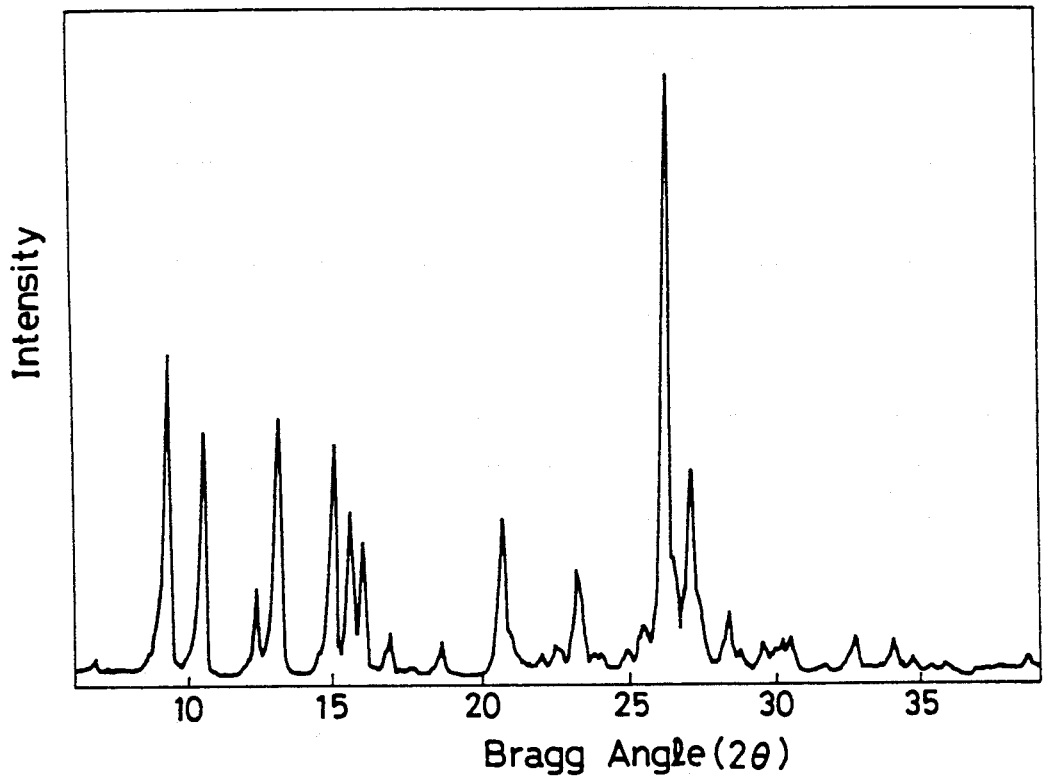
FIG. 3 and FIG. 5 show X-ray diffraction spectra of the conventional β-phase and α-phase crystalline oxytitanium phthalocyanines, respectively.

According to the present invention, the starting oxytitanium phthalocyanine is most reasonably selected from crystalline oxyphthalocyanines such as those having α-phase or β-phase from the viewpoint of the purpose of the invention, but, in some cases, amorphous oxytitanium phthalocyanine may be also used as the starting material as described hereinafter. As seen from the representative X-ray diffraction spectrum of the α-phase oxytitanium phthalocyanine shown in FIG. 5, it usually presents distinct diffraction peaks at Bragg angles ($2\theta \pm 0.2°$) of 7.5°, 22.3°, 25.3° and 28.6° at least. The β-phase oxytitanium phthalocyanine, of which typical X-ray diffraction spectrum is shown in FIG. 3, usually shows distinct diffraction peaks at Bragg angles of 9.3°, 10.6°, 13.2°, 15.1°, 15.7°, 16.1°, 20.8°, 23.3°, 26.3° and 27.1° at least.

Figure 4:
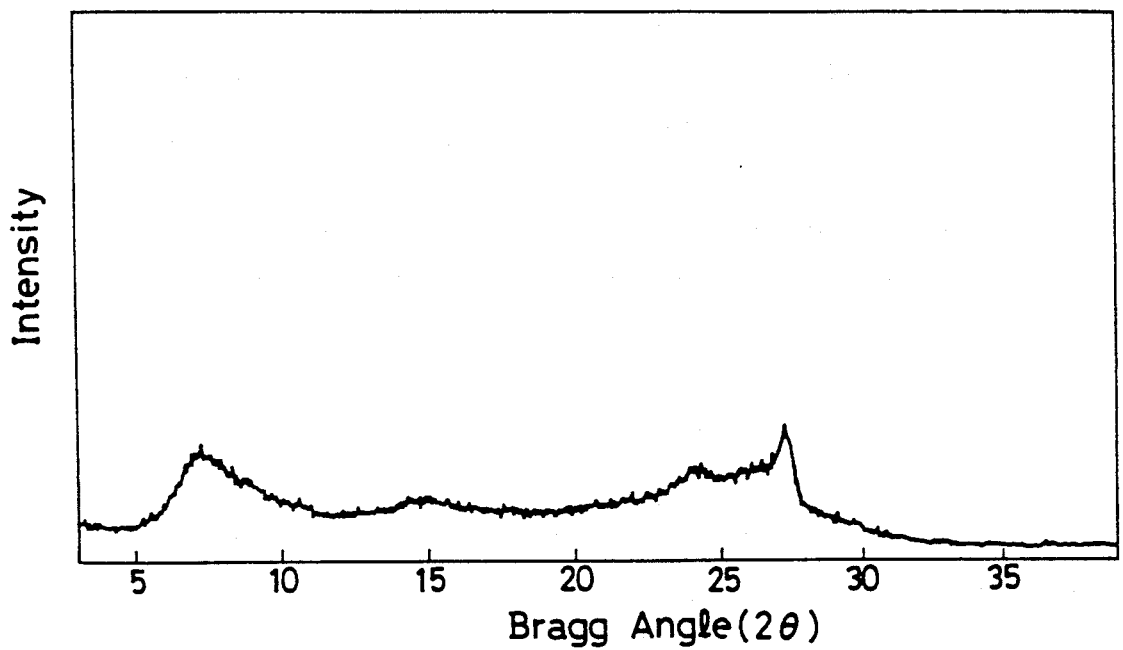
FIG. 4 and FIG. 6 show X-ray diffraction spectra of the mechanically pulverized β-phase and α-phase oxytitanium phthalocyanines, respectively.
Figure 6:
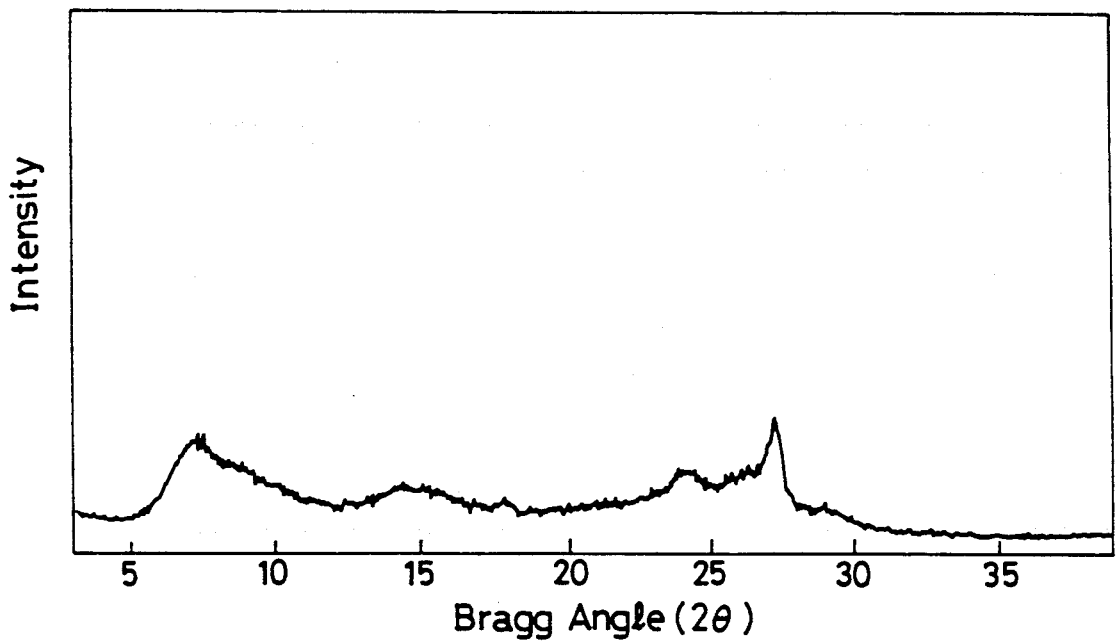

The expression of 'substantially amorphous' herein used is intended to include, in addition to a material of which spectrum evidently indicates the completely amorphous structure thereof, a material which may be regarded as amorphous on the whole since it shows only a weak peak or peaks in the diffraction spectrum. According to the present invention, by mechanical pulverization, crystalline oxytitanium phthalocyanine can be made into amorphous material of which X-ray diffraction spectrum shows essentially no diffraction peak, and by further pulverization, it begins showing a very weak but recognizable diffraction peak at a Bragg angle ($2\theta \pm 0.2°$) of 27.3°, for example, as shown in FIGS. 4 and 6. According to the present invention, the desired crystalline oxytitanium phthalocyanine showing a distinct diffraction peak at a Bragg angle ($2\theta \pm 0.2°$) of 27.3° in the X-ray diffraction spectrum can be produced by subjecting the substantially amorphous material obtained by the mechanical pulverization to the subsequent treatment defined herein. However, it is particularly preferable to use the material which has been sufficiently pulverized until it begins to show a recognizable diffraction peak at a Bragg angle of 27.3° as described above, since it enables to produce crystals showing the desired characteristics more distinctively, i.e., showing a stronger distinct diffraction peak and other weaker diffraction peaks than the case using the amorpous material.

Thus, the amorpous oxytitanium phthalocyanine may be also used as the starting material of the invention, since it can be made to show a recognizable diffraction peak at a Bragg angle ($2\theta \pm 0.2°$) of 27.3° by mechanical pulverization as described above.

The mechanical pulverization according to the invention can be carried out by any process so far as it can sufficiently pulverize the oxytitanium phthalocyanine until it has a substantially amorphous structure. For example, it can be carried out under wet or dry condition, preferably under dry condition, by means of a conventional dispersing apparatus such as a paint shaker, sand grind mill, ball mill, roll mill, attriter, vibration mill and colloid mill, preferably by a paint shaker or sand grind mill, particularly by a paint shaker. For an industrial production, the pulverization treatment is suitably carried out in a duration selected from a range of 5 to 100 hours depending on the pulverization apparatus to be employed.

According to the present invention, the substantially amorphous oxytitanium phthalocyanine obtained as above is dispersed in water, then added with an organic solvent and heat-treated. Examples of the organic solvent suitable for the present invention include various water-insoluble aliphatic organic solvents such as chloroform, dichloroethane, n-hexane and butyl acetate, and aromatic organic solvents such as monochlorobenzene, dichlorobenzene, toluene, xylene, nitrobenzene and α-chloronaphthalene. Though the proportions of the components contained in the suspension may vary within a wide range as far as the amorphous compound may be dispersed therein, the proportion of the solid component is preferably 2 to 50% by weight of the suspension and the proportion of the organic solvent is not more than 200%, preferably 5 to 100% by weight of the water contained in the suspension. As to the heat treatment, though it is preferable to perform it as sufficient as possible for surely obtaining the oxytitanium phthalocyanine of the desired crystal phase, it may be satisfactorily carried out for the industrial production at a temperature of from 30° to 100° C., preferably 40° to 70° C. for 1 to 5 hours.

Figure 1:
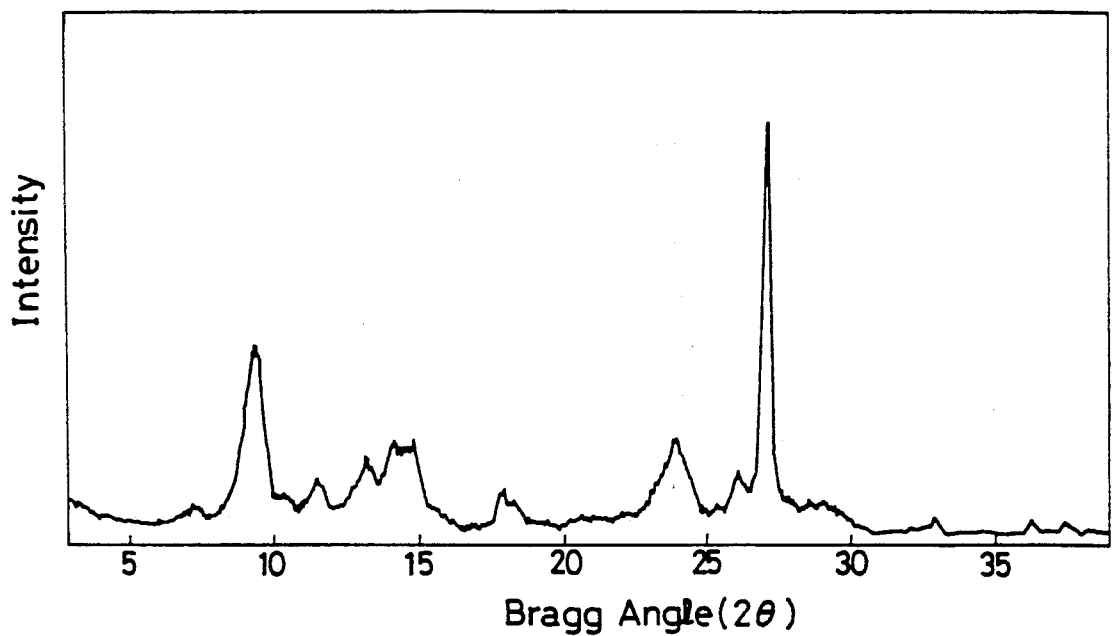
FIG. 1 and FIG. 2 show X-ray diffraction spectra of the crystalline oxytitanium phthalocyanines according to the invention obtained in Example 1 and Example 2, respectively.
Figure 2:
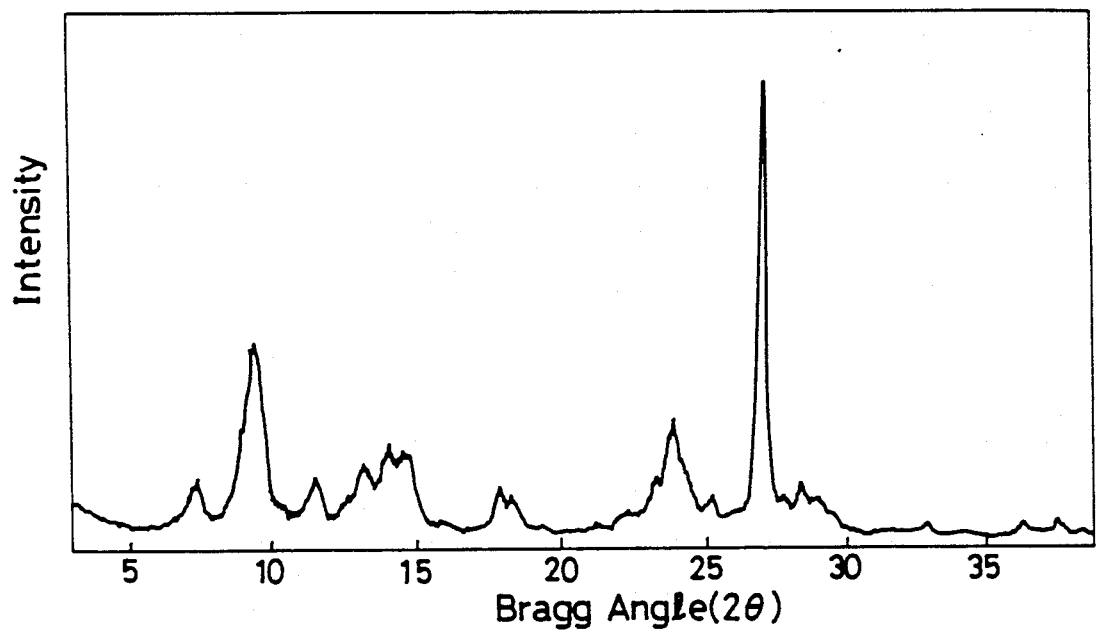

The expression of 'distinct diffraction peak' herein used means the strongest (or the highest) peak in the peak intensity or the sharpest peak in the peak shape in the X-ray diffraction spectrum of the material in powder form. The X-ray diffraction spectrum of the crystalline oxytitanium phthalocyanine obtained according to the present invention presents a distinct diffraction peak at a Bragg angle ($2\theta \pm 0.2°$) of 27.3°, for example, as shown in FIGS. 1 and 2. The nature of the other diffraction peaks such as those observed at 9.7° and 24.1° may vary depending on the production conditions, but it has a relatively broad width.

The oxytitanium phthalocyanine according to the invention presents at a Bragg angle ($2\theta \pm 0.2°$) of 27.3° a diffraction peak having the smallest S value, an index for indicating the degree of the distinctiveness (the sharpness) of the diffraction peak, among the diffraction peaks observed in the X-ray spectrum of the powdered material. The ratio of the S value of the peak at a Bragg angle ($2\theta \pm 0.2°$) of 27.3° to S value of any other diffraction peak is, preferably, not more than 0.25. The S value was calculated according to the following equation:

$$S = hw/Ht$$

hw: a width of a peak at the half peak-height
Ht: the peak-height
from the individual peak shape observed in the X-ray diffraction spectrum of the powdered material obtained under the following conditions:
X-ray bulb: Cu
Voltage: 40.0 kV
Current: 100.0 mA
Starting angle: 6.00°
Stopping angle: 35.00°
Stepping angle: 0.020°
Measurement duration: 0.50 sec Though the crystalline oxytitanium phthalocyanine obtainable by the present invention may be used for various applications, it is particularly suitable for use in an electrophotographic photoreceptor, especially as a charge generation material thereof.

The practical application of the crystalline oxytitanium phthalocyanine according to the invention in the production of an electrophotographic photoreceptor will be described hereafter.

At present, photoreceptors for the electrophotography using an organic compound can be roughly classified into a monolayer-type photoreceptor and a dual layer-type photoreceptor. The latter type, the dual layer-type photoreceptor had been developed to significantly improve the performance thereof by using different materials from each other for the functions of charge generation and charge transportation, and various organic compounds have been developed for the charge generating material of the dual layer-type photoreceptor.

The dual layer-type photoreceptor comprises at least an electro-conductive substrate, charge generation layer and charge transport layer. Though the charge transport layer is usually laminated over the charge generation layer, they may be laminated reversely.

In addition, an intermediate layer such as an adhesive layer, blocking layer and protective layer may be formed to improve the electric characteristics and mechanical properties of the photoreceptor.

As the electro-conductive substrate, well-known materials employed in the electrophotographic photoreceptor may be used, and they include; drums, sheets of metals such as aluminium, stainless steel and copper, foil laminates and deposition products of these metals; plastic films, plastic drums, paper and paper tubes which are made electro-conductive by coating an electro-conductive material such as metal powder, carbon black, copper iodide and polymeric electrolyte together with an appropriate binder; plastic sheets and drums rendered electro-conductive by incorporation of electro-conductive materials such as metal powder, carbon black and carbon fibers; plastic films and belts treated with a electro-conductive metal oxide such as tin oxide and indium oxide.

The charge generation layer may be formed on the electro-conductive substrate described above by coating and drying a coating solution prepared by dissolving or dispersing the oxytitanium phthalocyanine particles of the invention and a binder polymer, optionally with organic photoconductive compounds, dyes, electron accepting compounds and the like in a solvent.

Examples of the binder include polymers and copolymers of vinyl compounds such as styrene, vinyl acetate, vinyl chloride, acrylic acid esters, methacrylic acid esters, vinyl alcohol and ethyl vinyl ether, polyvinyl acetal, polycarbonate, polyester, polyamide, polyurethane, cellulose ester, cellulose ether, phenoxy resin, silicon resin and epoxy resin.

Though the mixing ratio between the oxytitanium phthalocyanine and the binder is not particularly limited, the binder polymer is generally used in an amount of from 5 to 500 parts by weight, preferably from 20 to 300 parts by weight per 100 parts by weight of the oxytitanium phthalocyanine.

The thickness of the charge generation layer is from 0.05 to 5 μm, preferably from 0.1 to 2 μm.

The charge transport layer to which charge carriers are injected from the charge generation layer contains a carrier transport material having a high carrier injection efficiency and a high transport efficiency.

Examples of the carrier transport material include polymeric compounds having on the side chain thereof heterocyclic groups or polycondensed aromatic groups such as poly-N-vinyl carbazole and polystyryl anthracene, as well as monomeric compound such as heterocyclic compound, for example, pyrazoline, imidazole, oxazole, oxadiazole, triazole and carbazole, triarylalkane derivative, for example, triphenylmethane, triarylamine derivative, for example, triphenylamine, phenylenediamine derivative, N-phenyl carbazole derivative, stilbene derivative and hydrazone compound. High electron-donating compounds having an electron-donating group such as a substituted amino or alkoxy group or aromatic ring group having these substituents are particularly mentioned. Further, a binder polymer may be incorporated into the charge transport layer, if required. Preferred binder polymers are those having a good compatibility with the carrier transport material so that the carrier transport material neither crystallizes nor results in the phase separation after the formation of the coating film. Examples of the preferred binder are polymers and copolymers of vinyl compounds such as styrene, vinyl acetate, vinyl chloride, acrylic acid ester, methacrylic acid ester and butadiene, polyvinyl acetal, polycarbonate, polyester, polysulfone, polyphenylene oxide, polyurethane, cellulose ester, cellulose ether, phenoxy resin, silicon resin and epoxy resin.

In the case where the carrier transport material is the polymeric compound, though there is no particular need to add the binder polymer, it may be mixed for the improvement of flexibility and the like. In the case where the material is the monomeric compound, the binder polymer is mixed for providing the film forming property in an amount usually ranging from 50 to 3,000 parts by weight, preferably from 70 to 1,000 parts by weight per 100 parts by weight of the carrier transport material. In addition, various additives may be incorporated into the charge transport layer for the improvement in the mechanical strength and the durability of the coated film. Examples of such additives include conventional plasticizers, various stabilizers, fluidifying agents, cross-linking agent and the like.

According to the present invention, various advantages in the industrial production of the crystalline oxytitanium phthalocyanine showing a distinct peak at a Bragg angle ($2\theta \pm 0.2°$) of 27.3° can be provided. For example, the crystalline oxytitanium phthalocyanine may be produced by relatively simple procedures with a good yield.

The electrophotographic photoreceptor having the charge generation layer containing the crystalline oxytitanium phthalocyanine according to the invention has a high sensitivity, a low residual potential and a high charge acceptance, as well as shows less changes during repeating use and, particularly, has satisfactory charging stability giving an effect on the image density. Therefore, it can be used as a high durable photoreceptor. Further, since the spectral sensitivity in the region from 750 to 800 nm is high, the photoreceptor is particularly suitable for the semiconductor laser printer.

This invention is further illustrated more specifically by reference to the following Examples and Comparative Examples, but they do not limit the scope of the invention since the scope of the invention is defined by the appended claims.

EXAMPLE 1

β-phase oxytitanium phthalocyanine (2.0 g), of which X-ray diffraction spectrum is shown in FIG. 3, was shaken with 15 ml of glass beads in a paint shaker for 50 hours. Then, the phthalocyanine crystals were washed out from the shaker with methanol, recovered by filtration and dried. The resulted phthalocyanine had an amorpous structure as seen from the X-ray diffraction spectrum thereof shown in FIG. 4 where any substantial peak is not observed.

The amorphous phthalocyanine was suspended in 45 ml of water, added with 3 ml of o-dichlorobenzene and stirred at 60° C. for 1 hour. The suspension was then allowed to cool, added with 400 ml of methanol and stirred for 1 hour. Then, the suspension was filtered and the residue was dried.

The obtained oxytitanium phthalocyanine (Yield: 1.8 g) showed a distinct peak at a Bragg angle ($2\theta \pm 0.2°$) of 27.3° (S value 0.02) in the X-ray diffraction spectrum as shown in FIG. 1, and evidently different from the β-phase starting material, of which spectrum is shown in FIG. 3.

Figure 5:
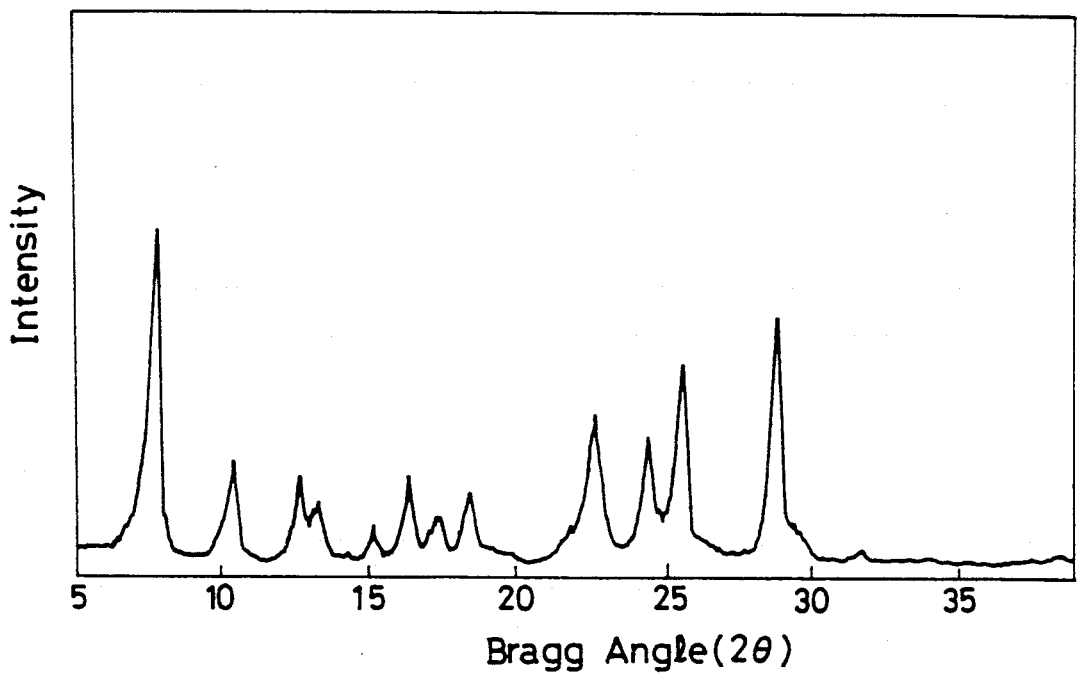

EXAMPLE 2

α-phase oxytitanium phthalocyanine (2.0 g), of which X-ray diffraction spectrum is shown in FIG. 5, was shaken with 15 ml of glass beads in a paint shaker for 8 hours. Then, the phthalocyanine crystals were washed out from the shaker with methanol, recovered by filtration and dried. The resulted phthalocyanine had an amorphous structure as seen from the X-ray diffraction spectrum thereof shown in FIG. 6 where any substantial peak is not observed.

The amorphous phthalocyanine was suspended in 45 ml of water, added with 3 ml of o-dichlorobenzene and stirred at 60° C. for 1 hour. The suspension was then allowed to cool, added with 400 ml of methanol and stirred for 1 hour. Then, the suspension was filtered and the residue was dried.

The obtained oxytitanium phthalocyanine (Yield: 1.7 g) showed a distinct peak at a Bragg angle ($2\theta \pm 0.2°$) of 27.3° (S value: 0.02) in the X-ray diffraction spectrum as shown in FIG. 2, and evidently different from the α-phase starting material, of which spectrum is shown in FIG. 5.

EXAMPLE 3

Production of Photoreceptor

A dispersion was formed by dispersing 0.4 g of crystalline oxytitanium phthalocyanine obtained in Example 1 and 0.2 g of polyvinyl butyral (Trade Name #6000C manufactured by DENKI KAGAKU KOGYO limited) together with 30 g of 4-methoxy-4-methyl-2-pentanone by means of a sand grinder, and the dispersion was coated on a vapor-deposited aluminium layer on a polyester film by means of film applicator and dried to form the charge generation layer in dry thickness of 0.3 g/m².

A charge transport layer of 17 μm in thickness, produced from 90 parts of N-methyl-3-carbazolecarbaldehyde diphenylhydrazone and 100 parts of polycarbonate resin (Iupilon ™ E-2000, Mithsubishi Gas Chemicals Company, Inc.), was formed on the charge generation layer to obtain an electrophotographic photoreceptor having a dual layer-type photosensitive layer.

For evaluating the sensitivity of the photoreceptor, the half-decay exposure intensity ($E_\frac{1}{2}$) was measured by an electrostatic paper analyzer (Model SP-428, Kawaguchi Denki Seisakusho). That is, the photoreceptor was charged negatively by a corona discharge under an application voltage such that the corona current was 50 μA under dark condition and then the photoreceptor was exposed to incandescent monochromatic light at 775 nm of the strength of 0.125 μW/cm². The half-decay exposure intensity ($E_\frac{1}{2}$) required for decaying the surface potential to one-half, that is, from −500 to −250 V was determined to be 0.21 μJ/cm².

In this case, the photoreceptor had the charged voltage (initial surface potential) of 664 V, and the surface potential after 10 second of exposure (residual potential) of −8 V.

The above-described evaluation procedure was repeated by using white light as the light source in stead of monochromic light of 775 nm to determine the initial surface potential, the residual potential and the half-decay exposure intensity.

The results are summarized in Table 1 hereinafter with the charge retaining ratio after 2000 charge cycles.

EXAMPLE 4

The procedures of Example 3 were repeated by using the crystalline oxytitanium phthalocyanine obtained in Example 2 instead of the crystals obtained in Example 1. The half-decay exposure intensity determined was 0.22 μJ/cm$^2$.

COMPARATIVE EXAMPLE 1

Preparation of Oxytitanium Phthalocyanine by Acid Paste Method

A solution of 12 g of α-phase oxytitanium phthalocyanine in 120 ml of concentrated sulfuric acid was added dropwise into 500 ml of ice water over 3 hours, while taking care to avoid the temperature raise. After the addition, the mixture was stirred for 30 minutes and filtered by aspiration. The obtained cake was subjected to a series of washing treatments by suspending in washing liquors and recovering from the liquors by suction filtration, using as the washing liquors 1 liter each of water, 0.3N aqueous solution of sodium acetate, 3% aqueous solution of acetic acid and twice of water in this order, to obtain a washed cake containing about 50% of the solid component.

Then, about 16.8 g of the obtained cake was added with 40 ml of water to produce a paste containing 15% of solid content. The obtained paste was added with 112 ml of water and 11.2 g of o-dichlorobenzene and stirred at 50° to 60° C. for 1 hour. After the stirring, the water is removed by decantation, and residue was added with 260 ml of methanol and homogenized by sonication.

The obtained dispersion was filtered and the residue was washed with methanol and water and once again with methanol successively. After filtering the washed dispersion, the resulted cake was dried under a reduced pressure at 60° C. for 12 hours.

The obtained oxytitanium phthalocyanine (Yield: 5.3 g) showed a distinct peak at a Bragg angle (2θ±0.2°) of 27.3° in the X-ray diffraction spectrum.

COMPARATIVE EXAMPLE 2

Production of Photoreceptor

The procedures of Example 3 were repeated by using the crystalline oxytitanium phthalocyanine obtained in Comparative Example 1 to obtain an electrophotographic photoreceptor.

Using a light source of white light, the initial surface potential, the residual potential, the half-decay exposure intensity and the charge retaining ratio were measured in the same way as Example 3.

The results are shown in Table 1.

TABLE 1

| | Initial Surface Potential (V) | Residual Potential (V) | Half-decay Exposure (lux.sec) | Charge Retaining Ratio (%) |
|---|---|---|---|---|
| EXAMPLE 3 | −670 | −61 | 0.6 | 89 |
| COMPARATIVE | −660 | −84 | 0.8 | 64 |

TABLE 1-continued

| | Initial Surface Potential (V) | Residual Potential (V) | Half-decay Exposure (lux.sec) | Charge Retaining Ratio (%) |
|---|---|---|---|---|
| EXAMPLE 2 | | | | |

Charge Retaining Ratio = (Surface Potential after 2000 Exposure Cycles/Initial Surface Potential) × 100

What is claimed is:

1. A process for transforming oxytitanium phthalocyanine to crystalline oxytitanium phthalocyanine for use in an electrophotographic photoreceptor showing a distinct diffraction peak at a Bragg angle (2θ±0.2°) of 27.3° in the X-ray diffraction spectrum, which comprises mechanically pulverizing the oxytitanium phthalocyanine, dispersing it in water to form a suspension, adding an organic solvent selected from the group consisting of chloroform, dichloroethane, n-hexane, butyl acetate, monochlorobenzene, dichlorobenzene, toluene, xylene, nitrobenzene, α-chloronaphthalene and a mixture of at least two of those solvents into the suspension and heating the suspension at a temperature of from 30° to 100° C.

2. A process for transforming oxytitanium phthalocyanine to crystalline oxytitanium phthalocyanine for use in an electrophotographic photoreceptor according to claim 1, wherein oxytitanium phthalocyanine is selected from the group consisting of α-phase, β-phase and amorphous oxytitanium phthalocyanines.

3. A process for transforming oxytitanium phthalocyanine to crystalline oxytitanium phthalocyanine for use in an electrophotographic photoreceptor according to claim 1, wherein the mechanical pulverization is carried out by means of a dispersing apparatus selected from the group consisting of a paint shaker, sand grind mill, ball mill, roll mill, attriter, vibration mill and colloid mill.

4. A process for transforming oxytitanium phthalocyanine to crystalline oxytitanium phthalocyanine for use in an electrophotographic photoreceptor according to claim 1, wherein the mechanical pulverization is carried out by means of a paint shaker under a dry condition.

5. A process for transforming oxytitanium phthalocyanine to crystalline oxytitanium phthalocyanine for use in an electrophotographic photoreceptor according to claim 1, wherein the suspension contains 2% to 50% by weight of oxytitanium phthalocyanine dispersed in water.

6. A process for transforming oxytitanium phthalocyanine to crystalline oxytitanium phthalocyanine for use in an electrophotographic photoreceptor according to claim 1, wherein the crystalline oxytitanium phthalocyanine obtained after the heat treatment also shows at least one diffraction peak at a Bragg angle (2θ±0.2°) of 9.7° or 24.1° in the X-ray diffraction spectrum.

7. A process for transforming oxytitanium phthalocyanine to crystalline oxytitanium phthalocyanine for use in an electrophotographic photoreceptor according to claim 1, wherein α-phase oxytitanium phthalocyanine is mechanically pulverized to make it into substantially amorphous oxytitanium phthalocyanine, the substantially amorphous oxytitanium phthalocyanine is dispersed in water to form a suspension, the suspension is added with an organic solvent selected from the group consisting of chloroform, dichloroethane, n-hexane, butyl acetate, monochlorobenzene, dichlorobenzene, toluene, xylene, nitrobenzene, α-chloronaphthalene and a mixture of at least two of those solvents, and the suspension is heated at a temperature of from 30° to 100° C. to obtain the crystalline oxytitanium phthalocyanine.

* * * * *